United States Patent
Wang et al.

(10) Patent No.: US 12,182,698 B2
(45) Date of Patent: Dec. 31, 2024

(54) INTERPRETABLE VISUALIZATION SYSTEM FOR GRAPH NEURAL NETWORK

(71) Applicants: International Business Machines Corporation, Armonk, NY (US); Massachusetts Institute of Technology, Cambridge, MA (US)

(72) Inventors: Dakuo Wang, Cambridge, MA (US); Sijia Liu, Somerville, MA (US); Abel Valente, Buenos Aires (AR); Chuang Gan, Cambridge, MA (US); Bei Chen, Blanchardstown (IE); Dongyu Liu, Cambridge, MA (US); Yi Sun, Cambridge, MA (US)

(73) Assignees: International Business Machines Corporation, Armonk, NY (US); Massachusetts Institute of Technology, Cambridge, MA (US)

(*) Notice: Subject to any disclaimer, the term of this patent is extended or adjusted under 35 U.S.C. 154(b) by 1107 days.

(21) Appl. No.: 17/039,989

(22) Filed: Sep. 30, 2020

(65) Prior Publication Data
US 2022/0101120 A1    Mar. 31, 2022

(51) Int. Cl.
*G06N 3/04*    (2023.01)
*G06N 3/08*    (2023.01)

(52) U.S. Cl.
CPC ............. *G06N 3/08* (2013.01); *G06N 3/04* (2013.01)

(58) Field of Classification Search
CPC ............. G06N 3/04; G06N 3/045; G06N 3/08
See application file for complete search history.

(56) References Cited

U.S. PATENT DOCUMENTS

| 8,689,108 B1 * | 4/2014 | Duffield et al. ........ G06Q 30/02 715/737 |
| 11,360,763 B2 | 6/2022 | Wang |
| 2022/0138266 A1 | 5/2022 | Wang |

FOREIGN PATENT DOCUMENTS

| CN | 110348573 A | 10/2019 |
| CN | 110751269 A | 2/2020 |

(Continued)

OTHER PUBLICATIONS

Chen, Zhao-Min, Xiu-Shen Wei, Peng Wang, and Yanwen Guo. "Multi-label image recognition with graph convolutional networks." In Proceedings of the IEEE/CVF conference on computer vision and pattern recognition, pp. 5177-5186. 2019.; (Year: 2019).*

(Continued)

*Primary Examiner* — Lut Wong
(74) *Attorney, Agent, or Firm* — Caleb Wilkes; Otterstedt & Kammer PLLC

(57) ABSTRACT

Use a computerized trained graph neural network model to classify an input instance with a predicted label. With a computerized graph neural network interpretation module, compute a gradient-based saliency matrix based on the input instance and the predicted label, by taking a partial derivative of class prediction with respect to an adjacency matrix of the model. With a computerized user interface, obtain user input responsive to the gradient-based saliency matrix. Optionally, modify the trained graph neural network model based on the user input; and re-classify the input instance with a new predicted label based on the modified trained graph neural network model.

14 Claims, 12 Drawing Sheets

(56) References Cited

FOREIGN PATENT DOCUMENTS

| | | |
|---|---|---|
| CN | 110782044 A | 2/2020 |
| CN | 110909867 A | 3/2020 |
| CN | 110929870 B | 3/2020 |
| KR | 102068277 B1 | 2/2020 |
| WO | WO201981781 A1 | 5/2019 |
| WO | WO2019197613 A1 | 10/2019 |

OTHER PUBLICATIONS

Wu, Huijun. "Looking behind the curtain: saliency maps for graph machine learning" Medium.com. Apr. 21, 2019. https://medium.com/stellargraph/https-medium-com-stellargraph-saliency-maps-forgraph-machine-learning-5cca536974da. (Year: 2019).*

Goodfellow, Ian J., Jonathon Shlens, and Christian Szegedy. "Explaining and harnessing adversarial examples." arXiv preprint arXiv:1412.6572 (2014). (Year: 2014).*

Jin W, Ma Y, Liu X, Tang X, Wang S, Tang J. Graph Structure Learning for Robust Graph Neural Networks. arXiv preprint arXiv:2005.10203. May 20, 2020. (Year: 2020).*

Lin et al., Microsoft coco: Common objects in context. InEuropean conference on computer vision Sep. 6, 2014 (pp. 740-755). Springer, Cham.

Wu, Z., Pan, S., Chen, F., Long, G., Zhang, C., & Philip, S. Y. (Mar. 24, 2020). A comprehensive survey on graph neural networks. IEEE Transactions on Neural Networks and Learning Systems. 22 pages.

LeClair, A., Haque, S., Wu, L., & McMillan, C. (Apr. 7, 2020). Improved code summarization via a graph neural network. arXiv preprint arXiv:2004.02843 12 pages.

Ying R, Bourgeois D, You J, Zitnik M, Leskovec J. Gnn explainer: A tool for post-hoc explanation of graph neural networks. arXiv preprint arXiv:1903.03894. 2019 12 pages.

Gao J, Xu C. CI-GNN: Building a Category-Instance Graph for Zero-Shot Video Classification. IEEE Transactions on Multimedia. Jan. 27, 2020 (abstract 3 pages).

Chen ZM, Wei XS, Wang P. Guo Y. Multi-label image recognition with graph convolutional networks. InProceedings of the IEEE Conference on Computer Vision and Pattern Recognition 2019 (pp. 5177-5186).

T. N. Kipf and M. Welling, "Semi-supervised classification with graph convolutional networks," arXivpreprint arXiv:1609.02907, 2016 14 pages.

* cited by examiner

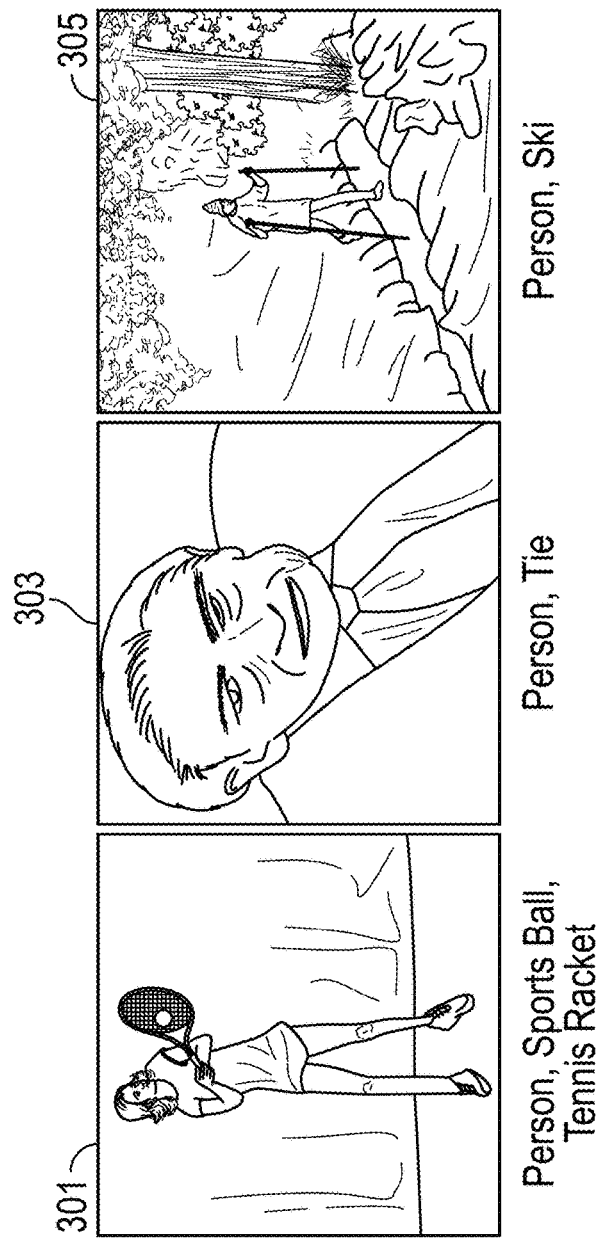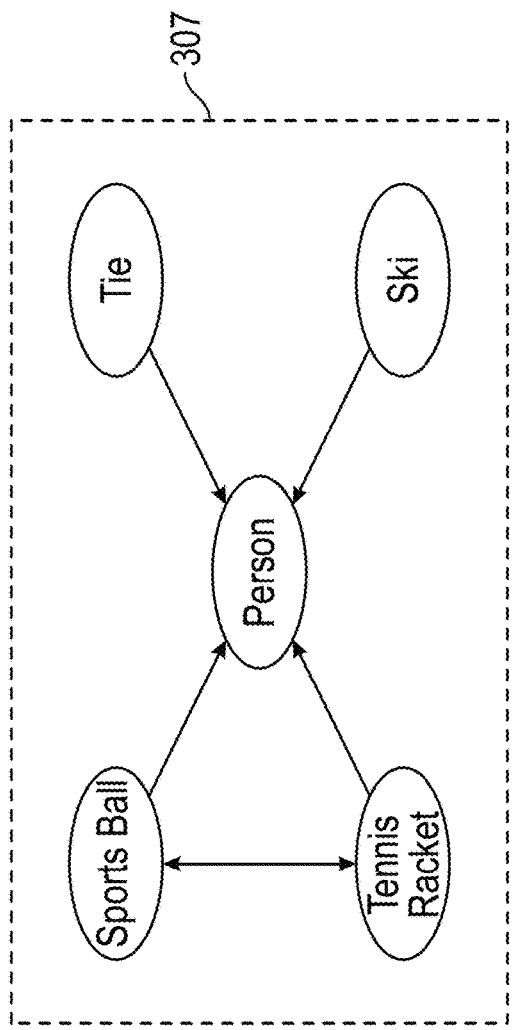
FIG. 3

*FIG. 9*

The Element-wise signs of S(A) have the following counterfactual explanation:
1. $A_{ij} > 0$ and $S_{ij} > 0$: The existing edge (i,j) should be removed to boost attack performance. This is consistent with factual explanation
2. $A_{ij} > 0$ and $S_{ij} < 0$: The existing edge (i,j) should be kept since it is beneficial to adversary. This is consistent with the factual explanation of importance of the edge (i,j).
3. $A_{ij} = 0$ and $S_{ij} > 0$: No counterfactual explanation exists.
4. $A_{ij} = 0$ and $S_{ij} < 0$: The missing edge (i,j) should be added to boost attack performance.

Global Network
803

Instance Sub-network
805A

Explanation GNN

Attack GNN

Instance Full Adjacent Matrix
807

Instance Adjacent Matrix (Threshold Applied)
809

INTERPRETABLE VISUALIZATION SYSTEM FOR GRAPH NEURAL NETWORK

BACKGROUND

The present invention relates to the electrical, electronic and computer arts, and more specifically, to machine learning and the like.

A Graph Neural Network (GNN) is a powerful method for machine learning on graph structural data. Data from many computer vision/machine learning/social network analysis (CV/ML/SNA) applications can be viewed as graph(s), and such representations offer significant flexibility to solve problems. GNNs combine node feature information and graph edge information by using neural networks to pass messages through edges in the graph.

However, incorporating both graph information and node information makes the GNN-based models very complex and hard to interpret.

SUMMARY

Principles of the invention provide techniques for visualization of graph neural networks. In one aspect, an exemplary method includes using a computerized trained graph neural network model to classify an input instance with a predicted label; with a computerized graph neural network interpretation module, computing a gradient-based saliency matrix based on the input instance and the predicted label, by taking a partial derivative of class prediction with respect to an adjacency matrix of the model; and, with a computerized user interface, obtaining user input responsive to the gradient-based saliency matrix.

In another aspect, an exemplary apparatus includes a memory, and at least one processor that is coupled to the memory and operative to: instantiate a computerized trained graph neural network model, a computerized graph neural network interpretation module, and a computerized user interface; use the computerized trained graph neural network model to classify an input instance with a predicted label; with the computerized graph neural network interpretation module, compute a gradient-based saliency matrix based on the input instance and the predicted label, by taking a partial derivative of class prediction with respect to an adjacency matrix of the model; and with the computerized user interface, obtain user input responsive to the gradient-based saliency matrix.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide higher speed, accuracy, and/or confidence for the machine learning prediction, while also reducing vulnerability to adversarial attack, reducing number of CPU cycles/computational complexity, and the like.

These and other features and advantages of the present invention will become apparent from the following detailed description of illustrative embodiments thereof, which is to be read in connection with the accompanying drawings.

BRIEF DESCRIPTION OF THE DRAWINGS

FIG. 3 shows aspects of using a GNN for multi-label image recognition;

FIG. 6, FIG. 7, FIG. 8, FIG. 9, and FIG. 10 show a user interface, in accordance with aspects of the invention, for graph saliency map-based explanation;

FIG. 11 and FIG. 12 show a user interface, in accordance with aspects of the invention, for graph saliency map-based attack;

DETAILED DESCRIPTION

Figure 1:
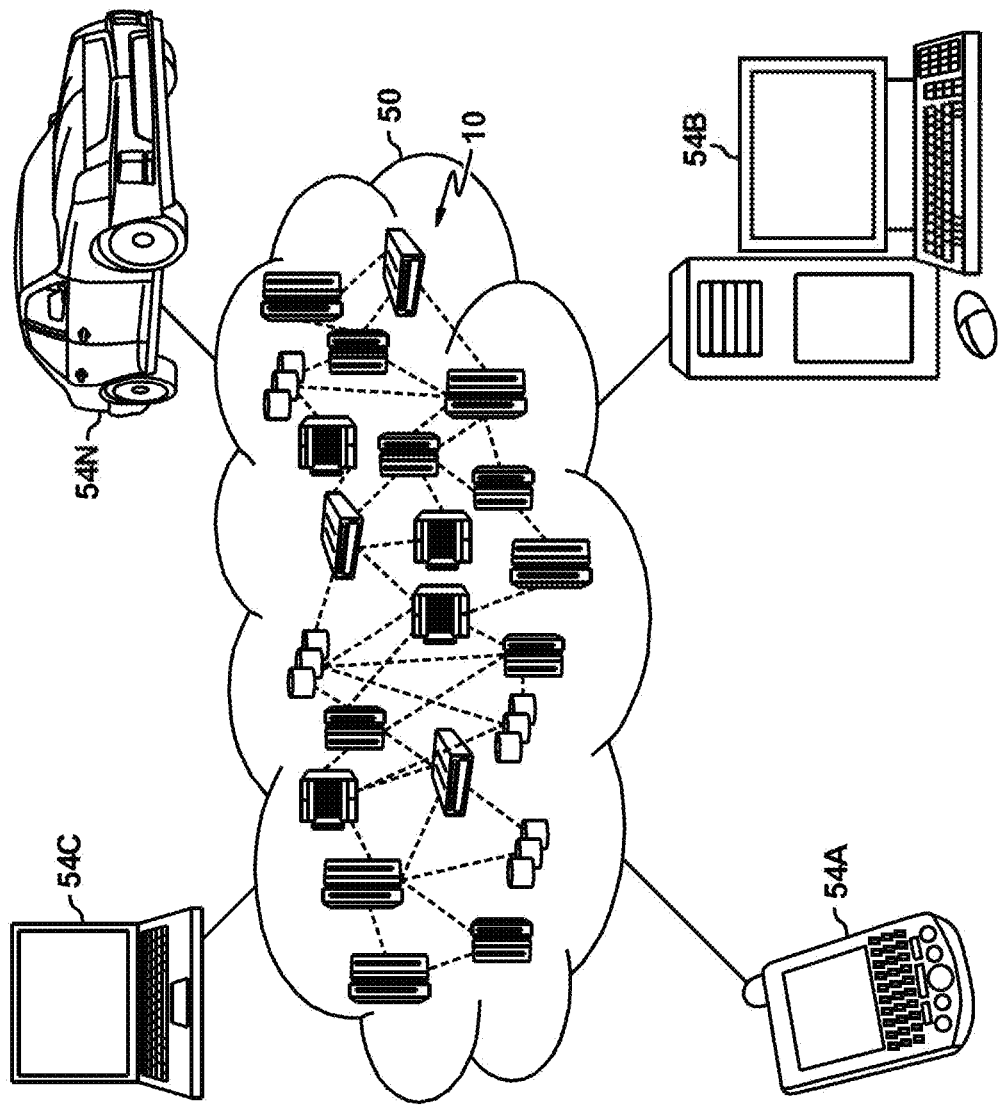
FIG. 1 depicts a cloud computing environment according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
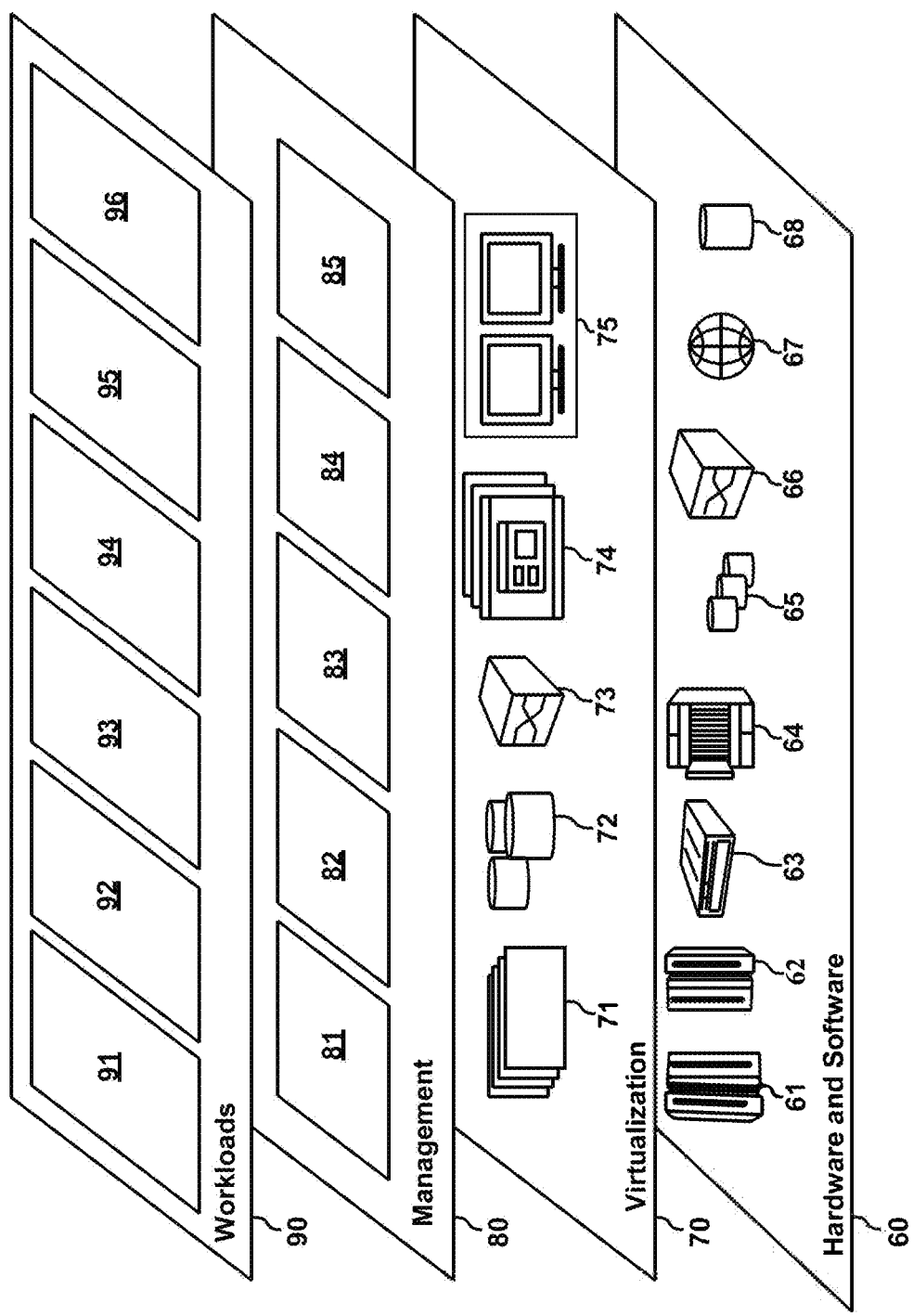
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a cloud-based service 96 (or one or more elements thereof) to provide an interpretable visualization system for graph neural network and the like.

One or more embodiments provide an interpretable visualization system for graph neural networks, referred to herein as "GNN-Viz." One or more embodiments are useful, for example, in the fields of human-computer interaction, artificial intelligence (AI), machine learning (ML), data science, computer-aided visualization, and the like. As noted, a Graph Neural Network (GNN) is a powerful method for machine learning on graph structural data. Data from many CV/ML applications can be viewed as graph(s), and such representations offer significant flexibility to solve problems. GNNs combine node feature information and graph edge information by using neural networks to pass messages through edges in the graph.

However, incorporating both graph information and node information makes the GNN-based models very complex and hard to interpret. One or more embodiments advantageously provide improved interpretation (i.e., a visualization system) which makes GNN-based models more explainable to analysts and more robust to adversarial attacks.

FIG. 3 shows aspects of using a GNN for multi-label image recognition. In FIG. 3, each image 301, 303, 305 has labels attached; e.g., person, sports ball, tennis racket, tie, and ski. The machine learning task is to predict the labels corresponding to each image 301, 303, 305 (multi-label image recognition). Traditionally, a convolutional neural network (CNN) is used for this task, in which each image is read pixel-by-pixel. In a GNN-based approach, however, the images are read in as part of the input data, which also includes a graph 307. Graph 307 embeds fundamental domain knowledge which is not present in the images per se. CNNs cannot typically extract such domain knowledge from a particular image. GNNs are thus superior to CNNs for this task. Graph 307 reflects the fact that a tennis racket and a sports ball are highly related. Further, the "tie" label is highly related to the "person" label. On the other hand, the "ski" label is distant from the "tennis racket" and "sports ball" labels.

Generally, a neural network includes a plurality of computer processors that are configured to work together to implement one or more machine learning algorithms. The implementation may be synchronous or asynchronous. In a neural network, the processors simulate thousands or millions of neurons, which are connected by axons and synapses. Each connection is enforcing, inhibitory, or neutral in its effect on the activation state of connected neural units. Each individual neural unit has a summation function which combines the values of all its inputs together. In some implementations, there is a threshold function or limiting function on at least some connections and/or on at least some neural units, such that the signal must surpass the limit before propagating to other neurons. A neural network can implement supervised, unsupervised, or semi-supervised machine learning.

The skilled artisan will be familiar with a variety of datasets, which typically contain many common object categories with thousands of labeled instances. Such datasets can have, for example, 80 labels such as bottle, car, person; each image in the dataset has one or more labels.

Figure 4:
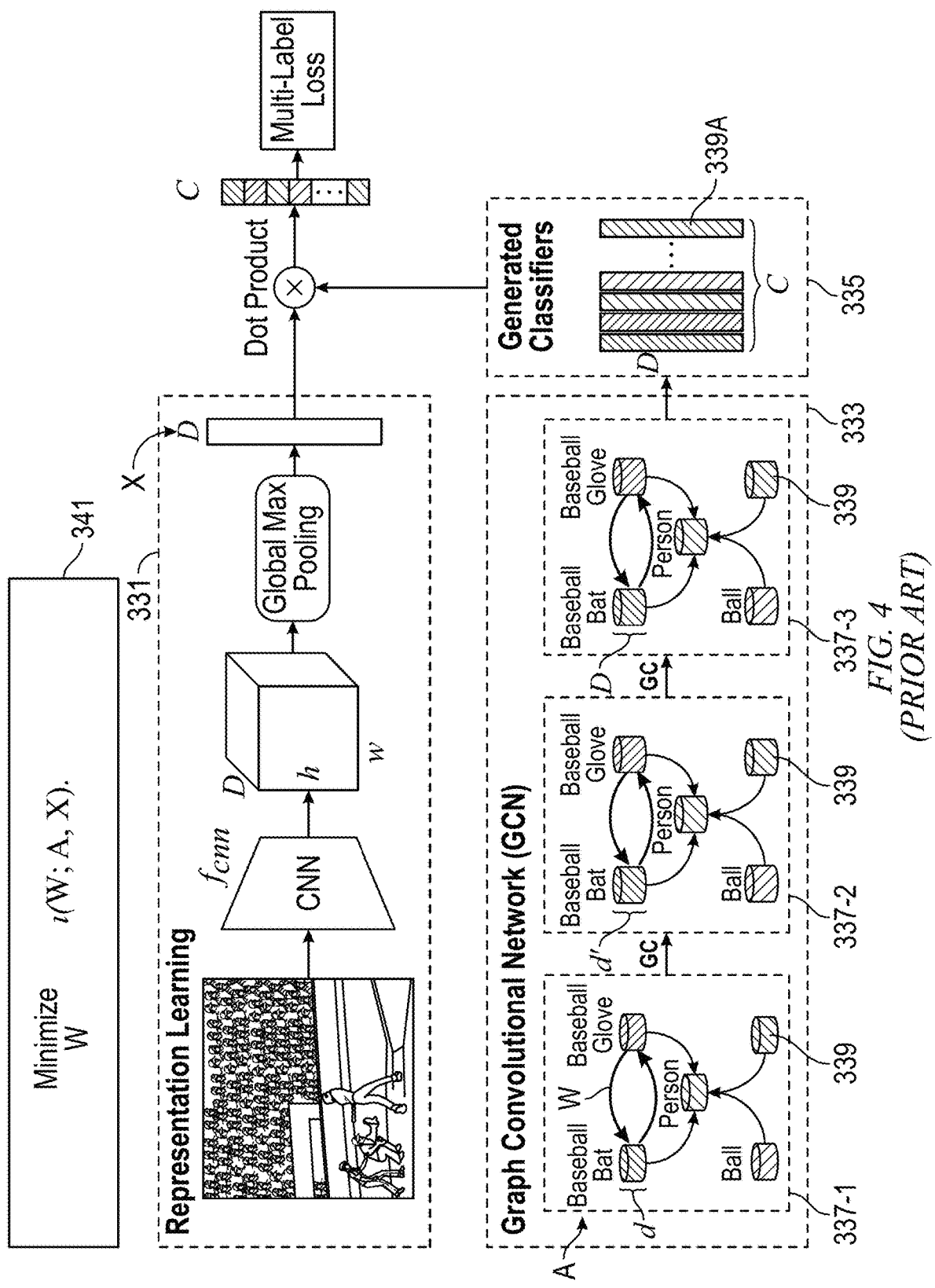
FIG. 4 shows aspects of a machine learning graph convolutional network (ML-GCN) as known from the prior art.

FIG. 4 shows aspects of a machine learning graph convolutional network (ML-GCN) on a suitable dataset, as known from the prior art; this is one context with which aspects of the invention can advantageously operate. Box 331 shows the traditional pixel-by-pixel analysis using a CNN on the images. Box 333 shows a GCN architecture, which incorporates knowledge graph information. Process 331 embeds the pixel information into vector D. Architecture 333 embeds the knowledge graph information into D×C matrix 335 (generated classifiers); C=80 corresponding to the exemplary 80 labels. D, the number of elements in the vector, is the number of neurons defined in the CNN (by way of example and not limitation 200-300). Each graph 337-1, 337-2, 337-3 in architecture 333 has 80 labels but only five are shown to avoid clutter; namely, baseball bat, baseball glove, person, ball, and a label 339 representative of all the remaining labels. The generated classifiers can correspond, for example, from left to right, to the baseball bat, baseball glove, person, and ball, with the rightmost classifier 339A corresponding to label 339. The dot product of D and matrix 335 gives a C by 1 dimension vector C. Each element in C is a number between 0 and 1 denoting the likelihood of each label; from top to bottom baseball bat, baseball glove, person, ball, and label 339 representative of all the remaining labels. A value of, e.g., 0.9 would mean a high likelihood that the image is labeled with the corresponding label. A value of, e.g., 0.01 would mean a low likelihood that the image is labeled with the corresponding label. The values in vector C are used to come up with the actual label(s) for each image. Let A stand for a matrix to include information about all the nodes in the graphs 337-1, 337-2, 337-3; let W stand for all the links (edges) between the nodes; and let X stand for the input image's pixel-wise information, which is a D-dimension matrix. The prediction task can then be represented by the equation in box 341, reproduced as equation (3) below, which seeks to minimize the error $\ell$ over W.

Consider now GCN problem formulation:

$$h_i^{(k)} = \sigma\left(\sum_{j \in N_i} \left((W^{(k-1)})^T h_j^{(k-1)} \overline{A}_{ij}\right)\right) \quad (1)$$

In the above, $\sigma(.)$ is the ReLU function. Let $\tilde{A}_i$ denote the ith row of $\overline{A}$ and $H^{(k)} = [(h_1^{(k)})^T; \ldots ; (h_N^{(k)})^T]$, then obtain the standard form of GCN:

$$H^{(k)} = \sigma(\tilde{A} H^{(k-1)} W^{(k-1)}) \quad (2)$$

In the above, $\overline{A}$ is given by a normalized adjacency matrix $\tilde{A} = \hat{D}^{-1/2} \hat{A} \hat{D}^{-1/2}$, where $\hat{A} = A + I$, and $\hat{D}_{ij} = 0$ if $i \neq j$ and $\hat{D}_{ii} = 1^T \hat{A}_{i,i}$.

Let $\ell$ (W; A, X) denote the classification loss of GNN parameterized by W at the graph input A and the node feature input X. Note that $-\ell$ (W; A, X) reflects the prediction accuracy. Training GNN can then be cast as:

$$\underset{W}{\text{minimize}}\, \ell(W; A, X) \quad (3)$$

Consider now an interpretation method for a single instance. Given a trained GNN model Φ and a predicted label (i.e., single instance explanation), a GNN interpretation will generate an explanation by returning edge connectivity patterns and node features that provide insights on what the model has learned. To that end, the GNN explainer relies on the general GNN formulation and only accesses Φ in terms of forward and backward propagation, which means that it is agnostic to the specific type of GNN.

Figure 5:
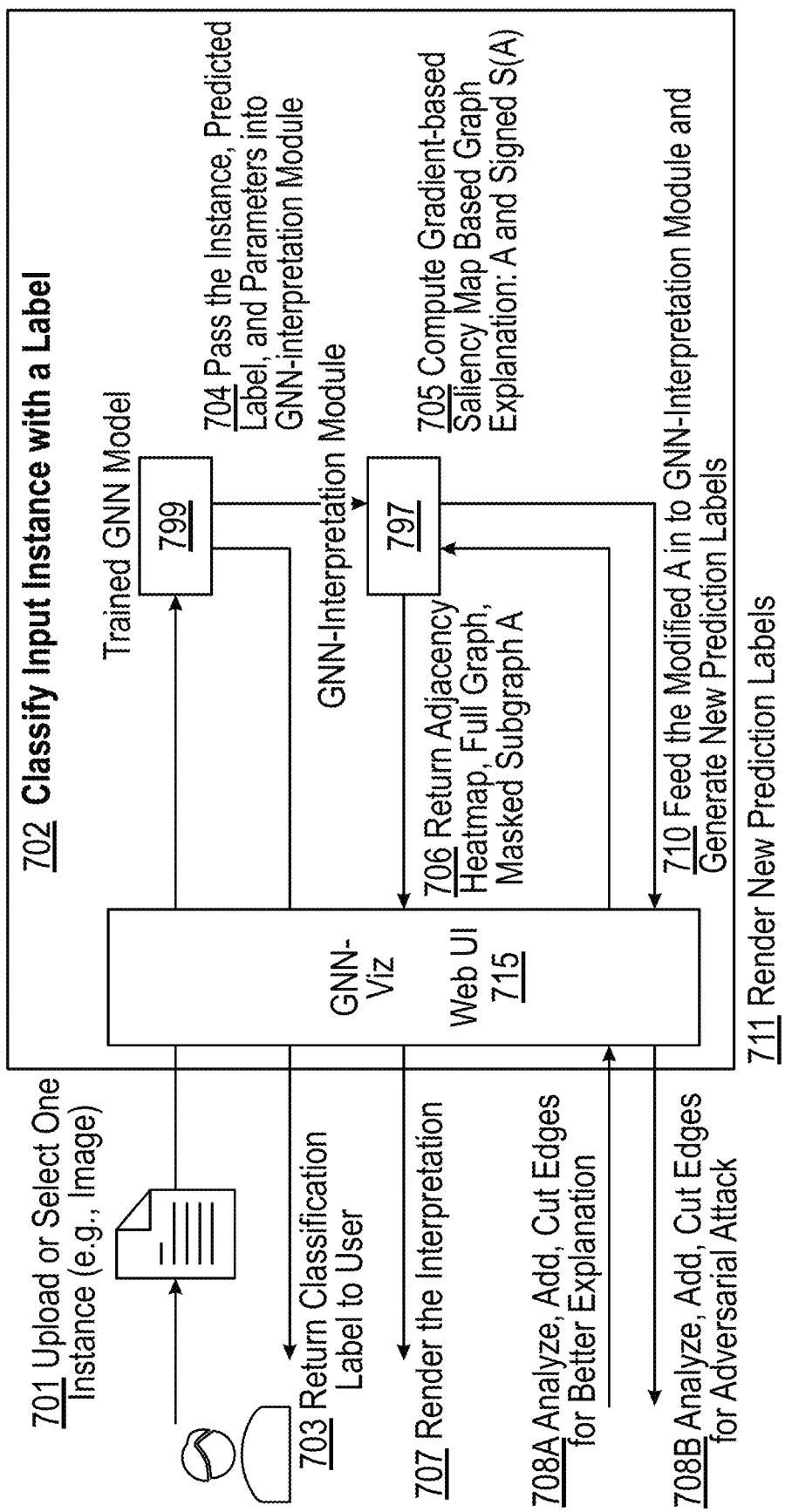
FIG. 5 is a combined flow chart and block diagram, according to an aspect of the invention.
Figure 6:
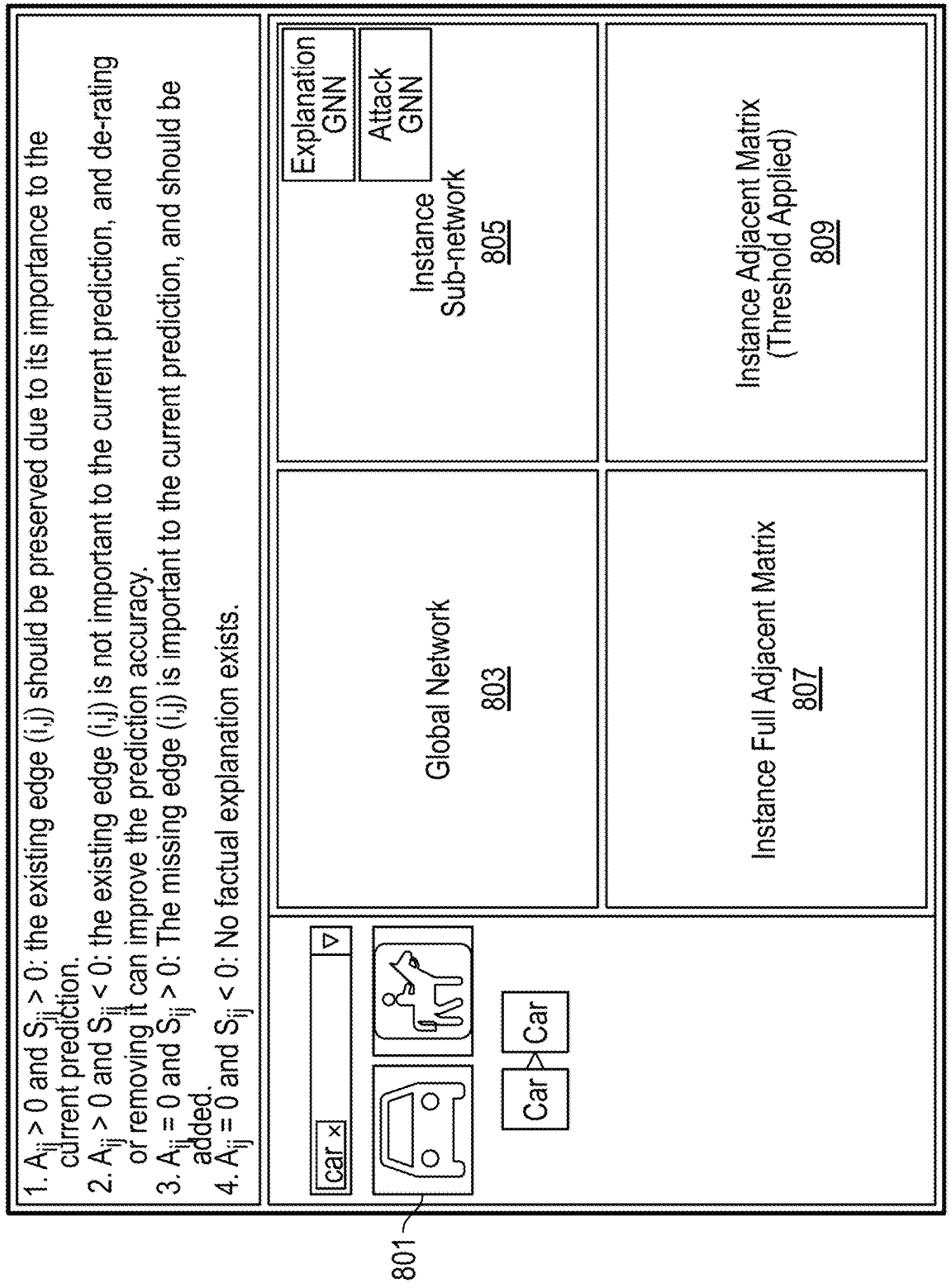
Figure 7:
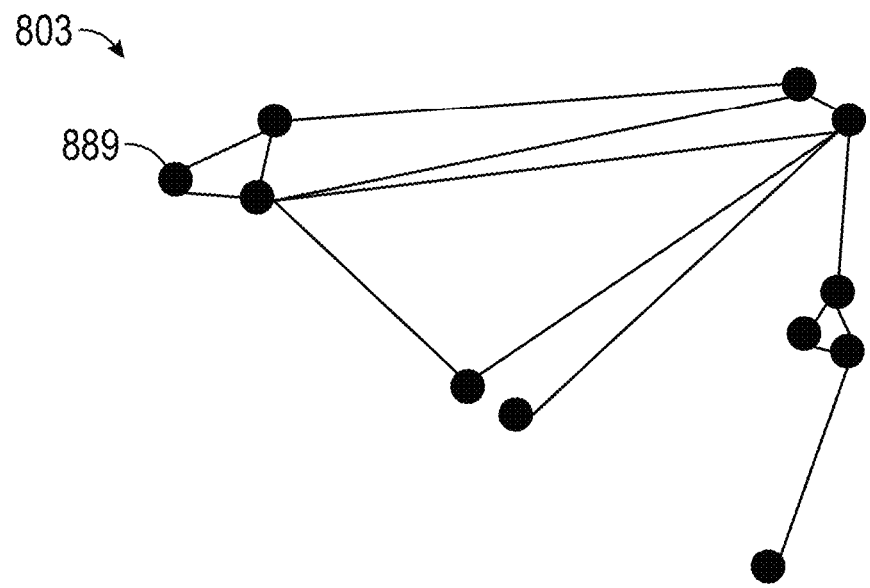

Currently, it is difficult for users to interpret why an image is classified with a certain label; e.g., elephant, telephone, cup of coffee. The models are highly mathematical. One or more embodiments facilitate explanation of GNN results, which help users interpret the graph edges and nodes. Refer to FIGS. 5 and 6. FIG. 6 shows an exemplary user interface (UI) for explanation. Each image (here, 801) has a ground truth label (e.g. "car") and a predictor label (here, also "car"). Note that icons of a "car" 801 and a "horse" are shown for illustrative convenience but an actual digital photograph of a "car" or a "horse" would be displayed in a physical embodiment. Four charts 803, 805, 807, 809 can be provided for each image, to help the user understand why the image with ground truth label "car" has been predicted as "car." Global network 803, shown in detail in FIG. 7, shows all the nodes and edges and is not specific to image 801. Each node 889 has a label, omitted to avoid cluttering the drawing. In instance sub-network 805, shown in detail in FIG. 8, the GNN interpretation algorithm disclosed herein suggests that edges 811, 813 are the most important because if they were cut (as suggested by the scissors icon), the classification/prediction will change very significantly. Furthermore, the GNN interpretation algorithm disclosed herein suggests that edge 815 be added (with addition suggested by the paintbrush icon). Adding edge 815 will result in significant improvement in the prediction/classification.

Figure 8:
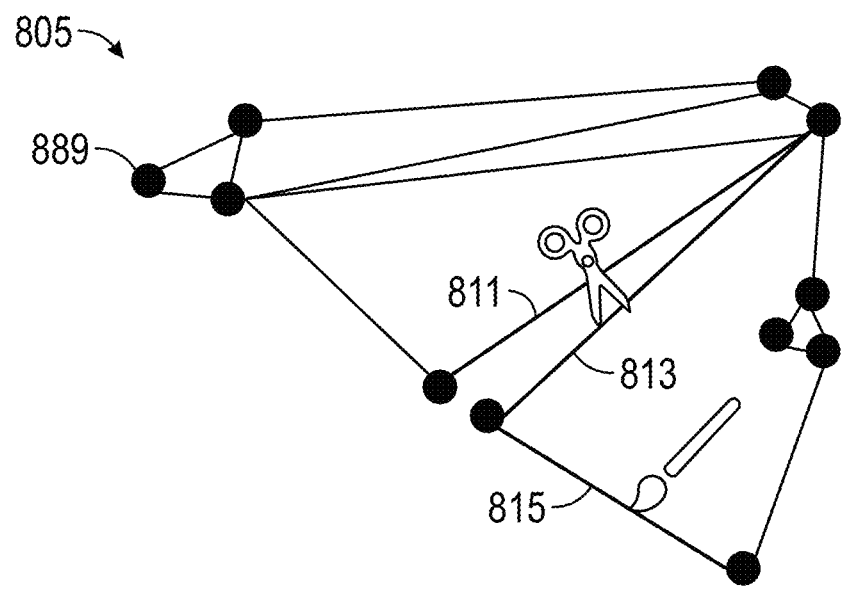

FIG. 7 is a baseline graph explaining the image 801. FIG. 8 is a modified graph explaining the image 801. The modified graph is expected to better predict the ground truth "car" for image 801; for example, the prediction probability score may be changed from a less correct to a more correct value.

Figure 9:
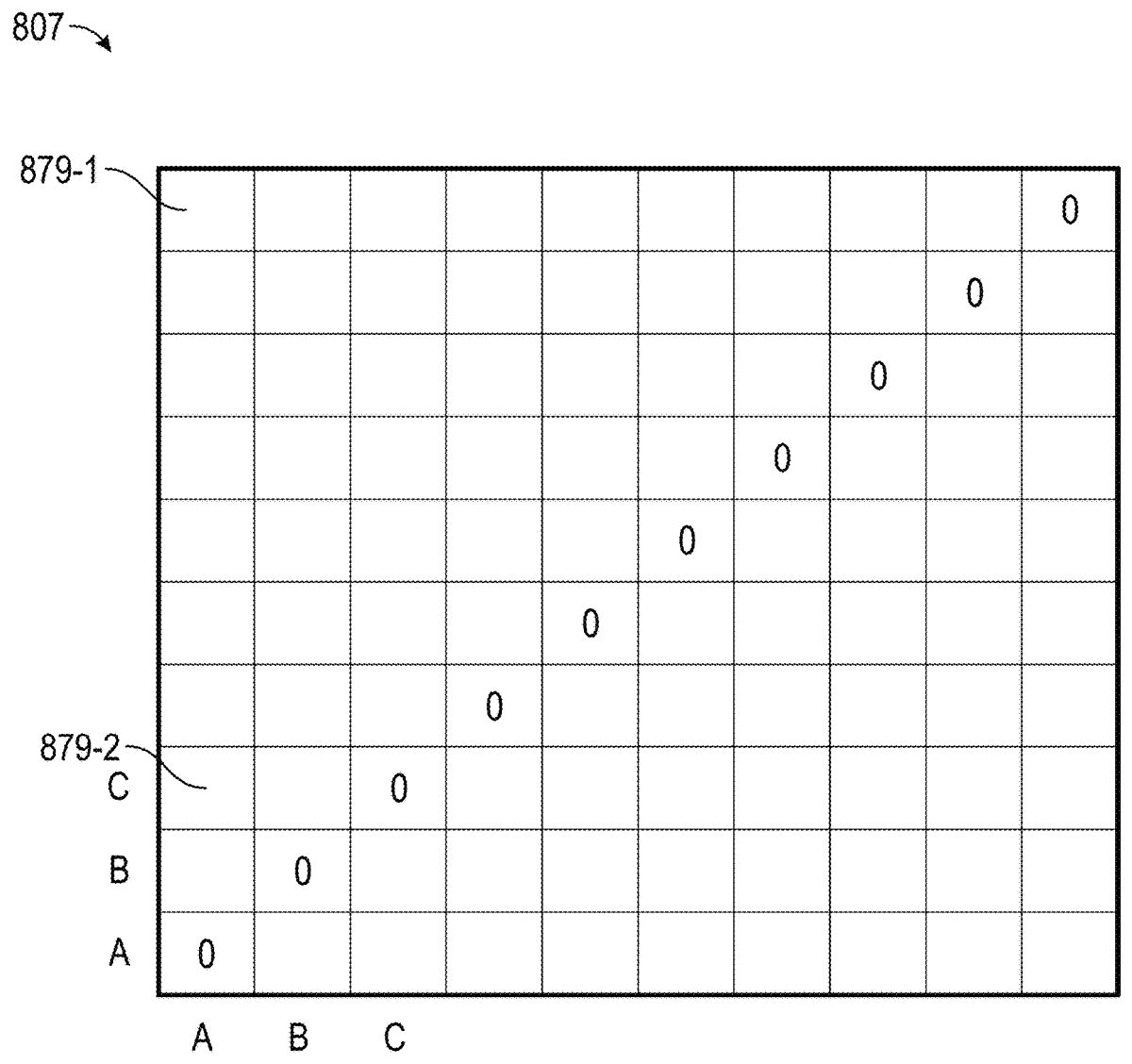
Figure 10:
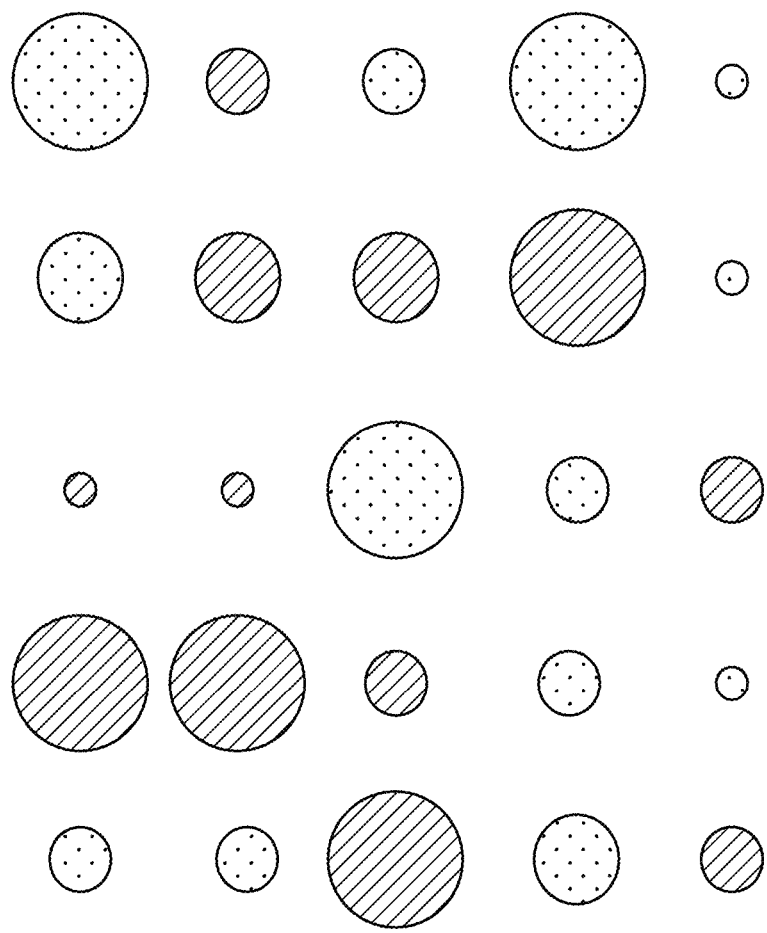

In instance full adjacent matrix 807, shown in detail in FIG. 9, each edge is represented as one dot 879-1, 879-2 in the "heat map." A heat map (or heatmap) is a data visualization technique that shows magnitude of a phenomenon as color in two dimensions. The variation in color may be by hue or intensity, giving obvious visual cues to the reader about how the phenomenon is clustered or varies over space. The horizontal and vertical axis include the same labels as the nodes in the graph 803; values such as A, B, C are shown for illustrative convenience but the labels correspond, for example, to "car," "horse," "baseball," "hat," and so on. The diagonal elements are empty since nodes are not connected to themselves; this is suggested in FIG. 9 by populating the diagonal with zeroes. Color is omitted from FIG. 9 for illustrative convenience however, in a non-limiting example, each dot is provided with a color and the lighter the color, the more important the corresponding edge. For example, if the edge between C and A is important, dot 879-2 has a light color. Shape, size, fill pattern, etc. can be used in addition to or in lieu of color. Only a 10 by 10 array of dots is shown in FIG. 9 for illustrative convenience. Applying a threshold to 807, obtain instance adjacent matrix 809, shown in detail in FIG. 10, showing the most important edges. Larger and darker-colored dotted edges are suggested for deletion, for example, while larger and darker-colored cross-hatched edges are suggested for addition, for example. Color, hatching, size, and the like can all be used for illustration. Only a subset of each were shown in 805 to avoid clutter. The number of labels on each axis is smaller (here shown 5 by 5) due to thresholding.

FIG. 11 shows an exemplary user interface (UI) for attack. Each image (here, 801) has a ground truth label (e.g. "car") but here the car may be mis-classified as a person. Note that icons of a "car" 801 and a "horse" are shown for illustrative convenience but an actual digital photograph of a "car" or a "horse" would be displayed in a physical embodiment. Four charts 803, 805, 807, 809 can be provided for each image, as before, to help the user understand why the image with ground truth label "car" has been predicted as "car." Global network 803 will be similar to that shown in detail in FIG. 7, which shows all the nodes and edges and is not specific to image 801. In instance sub-network 805A, shown in detail in FIG. 12, the GNN interpretation algorithm disclosed herein suggests that edges 821, 823 should be removed (suggested by scissors icon) to boost attack performance.

Elements 807, 809 will be similar to those described above, albeit for the adversarial case.

Refer now again to FIG. 5. At 701, the user uploads one instance (an image is a non-limiting example but other data modalities are possible; e.g., one sentence, a chemical molecule, and the like). At 702, the trained GNN model 799 makes a prediction (i.e. classifies the input instance with a label—e.g. "car" label of FIG. 8). In step 703, return the classification label (e.g. "car") to the user via web UI 715. In step 704, pass the instance, the predicted label, and the parameters into the GNN-Interpretation module 797; in step 705, the GNN-Interpretation module uses the passed information to compute a gradient-based saliency map-based graph explanation: A and signed S(A). In step 706, return the adjacency heatmap, full graph, and masked subgraph A. At 707, the UI 715 renders the interpretation of those items.

Two options now arise. In step 708A, analyze, add, and/or cut edges for a better explanation; alternatively, in step 708B, analyze, add, and/or cut edges for an adversarial attack. In step 710, feed the modifications (modified A) from step 708A or 708B, as the case may be, back in to the GNN-Interpretation module 797 and generate new prediction labels. In step 711, UI 715 renders the new prediction labels.

Now consider graph saliency map-based explanation. It is desired to make the prediction closer to the ground truth. Let W* be a solution to the problem (3). Then, the gradient-based saliency map-based graph explanation is given by:

$$S(A) := \frac{p_c(A; X, W^*)}{\partial A} \quad (4)$$

In the above, $p_c(A; X, W^*)$ denotes the prediction of class c for the learned GNN at inputs A and X.

With regard to interpreting the sign of S(A), in particular, prediction maximization, consider the following optimization problem to design a graph perturbation Δ:

$$\text{maximize}_{\|\Delta\|_\infty \leq \epsilon} \, p_c(A+\Delta; X, W^*) \quad (5)$$

By Taylor expansion, obtain:

$$p_c(A+\Delta; X, W^*) \approx p_c(A; X, W^*) + \Delta^T S(A) \quad (6)$$

Thus, to maximize (5) with the first order approximation (6), the following solution is yielded:

$$\Delta = \epsilon \times \text{sign}(S(A)) \quad (7)$$

Still considering graph saliency map-based explanation, when $A_{ij}>0$ and $S_{ij}>0$, the existing edge (i, j) should be preserved due to its importance to the current prediction. When $A_{ij}>0$ and $S_{ij}<0$, the existing edge (i, j) is not important to the current prediction, and de-rating or removing it can improve the prediction accuracy. When $A_{ij}=0$ and $S_{ij}>0$, the missing edge (i, j) is important to the current prediction, and should be added. When $A_{ij}=0$ and $S_{ij}<0$, no factual explanation exists.

Now, consider graph saliency map-based attack. Let W* be a solution to the problem (3). Then, the gradient-based saliency map-based graph explanation is given by (4) above. Apply the Taylor expansion of (6). With regard to interpreting the sign of S(A), in particular, adversarial perturbation, consider the following optimization problem to design a graph perturbation Δ:

$$\text{minimize}_{\|\Delta\|_\infty \leq \epsilon} \ p_c(A+\Delta; X, W^*) \quad (8)$$

Based on the Taylor expansion, to minimize (8), the following solution is yielded:

$$\Delta = -\epsilon \, \text{sign}(S(A)) \quad (9)$$

With regard to the graph saliency map-based attack, the element-wise signs of S(A) have the following counterfactual explanation. When $A_{ij}>0$ and $S_{ij}>0$, the existing edge (i, j) should be removed to boost attack performance—this is consistent with factual explanation. When $A_{ij}>0$ and $S_{ij}<0$, the existing edge (i, j) should be kept since it is beneficial to the adversary; this is consistent with the factual explanation of importance of the edge (i, j). When $A_{ij}=0$ and $S_{ij}>0$, no counterfactual explanation exists. When $A_{ij}=0$ and $S_{ij}<0$, the missing edge (i, j) should be added to boost attack performance.

One or more embodiments thus provide a system and method to compute an interpretation for a Graph Neural Network model, and to render an interactive visualization system that allows users to analyze, edit, interpret and attack the GNN model. One or more embodiments provide an interactive visualization system that can interpret the GNN models for both explanation of model and adversarial attack use cases. One or more embodiments also employ image classification as a case study problem. However, more generally, any GNN models working with graph datasets can work with one or more embodiments, which can generate a visualization for the model.

Figure 13:
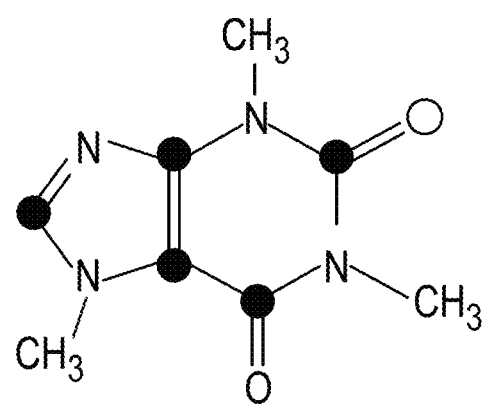
FIG. 13 shows a diagram of a caffeine molecule which can be classified in accordance with aspects of the invention.

For example, consider the caffeine molecule in FIG. 13. Suppose it is mis-classified as a molecule of a chemical compound other than caffeine. Each node in the graph represents an atom of carbon (solid dot), nitrogen N, or oxygen O, or a methyl radical $CH_3$, while each edge represents a corresponding chemical bond. Double as opposed to single bonds, for example, can be handled by appropriate weighting of the edges.

It is becoming more common to integrate graph-based neural network models to model real-world network-based data (e.g., molecules, social networks, images, videos). One or more embodiments advantageously provide a visualization technique for interpreting such models.

One or more embodiments thus provide a method using a computing device for automatically computing an explanation of a segment of programming code in the process of a graph neural network, considering user input. The method includes receiving, by a computing device, as input from a user, the model and the data sample instances. In one or more embodiments, in an interpretation step, take the input model and the data sample instance, and generate a gradient-based saliency matrix as the explanation for the input. In a visualization step, render the saliency matrix in the visualization user interface. In an adversarial attacking mode, take users' input on the visualization user interface (e.g., highlighting, deleting, or adding an edge), and re-calculate the prediction for the given data instance. In an interpretation mode, take the users' input on the visualization user interface (e.g., highlighting, deleting, or adding an edge), and re-calculate the prediction for the given data instance.

In another aspect, a method includes receiving experiment parameters as input by the user or chosen by the system; and capturing various stages of experiment(s) including data refinement, feature transforms, model selection, model tuning, pipeline selections, etc. Some embodiments further include explanation of the rationale behind choices made at each stage of the experiment. Some embodiments provide a button on the UI 715 (omitted to avoid clutter) to view/download the report of each experiment to understand different possibilities.

Given the discussion thus far, it will be appreciated that, in general terms, an exemplary method, according to an aspect of the invention, includes, as per step 702, using a computerized trained graph neural network model 799 (which can be any known prior art neural network) to classify an input instance with a predicted label. A further step 705 includes, with a computerized graph neural network interpretation module 797, computing a gradient-based saliency matrix S(A) based on the input instance and the predicted label, by taking a partial derivative of class prediction with respect to an adjacency matrix of the model. Note that A is the adjacency matrix, which contains all information about the edges, while the saliency matrix S(A) is a transformation on the A matrix, but highlighting only the most important edges. Computerized graph neural network interpretation module 797 includes, for example, suitable high-level computer code that is compiled and/or interpreted into machine-executable code, and which solves equations (4)-(7) for explanation or Equations (4), (6), (8), and (9) for attack.

Still a further step 708A and/or 708B includes, with a computerized user interface 715, obtaining user input responsive to the gradient-based saliency matrix. UI 715 can be implemented with known techniques for creating a GUI, such as via a server serving out html to a client or the like.

One or more embodiments further include modifying the trained graph neural network model 799 based on the user input (e.g. add and/or remove links based on user input); and re-classifying the input instance with a new predicted label based on the modified trained graph neural network model (repeat step 702 with model retrained/updated based on modified graph). Note that modification of the graph is not necessarily carried out in every case; for example, the user might conclude that the graph in its current form is suitable for accurate prediction, or that the graph in its current form is suitable for testing via adversarial attack, and that no modifications are needed. Thus, in some instances, rather than re-classifying, one could continue to use the existing model with confidence.

In one or more embodiments, the gradient-based saliency matrix technique described herein operates in a model environment such as is shown in FIG. 4 (i.e. techniques of FIG. 4 can be used in element 799). The GCN is, for example, a Graph Neural Network (GNN) while using the CNN as a basic unit in the network.

Furthermore regarding computing the gradient-based saliency matrix and carrying out explanation or attack, the "$p_c$" in Eq. (4) is the prediction of Class c. The A; X, W* in Eq. (4) represent each of the images. In the case where there are 80 labels, each image will have 80 probabilities; e.g., $p_{person}$, $P_{car}$, $P_{baseball}$, and so on. As noted, A is the adjacency matrix. The gradient-based saliency map S(A) computes the (partial) derivative of the probabilities with respect to the adjacency matrix A. A can be thought of as representing the links inside the image. For the explanation case, maximize the probability of correctness to make prediction accuracy higher. For example, consider an image of a person that is mis-classified as a sofa. There will be a $p_{sofa}$ (A; X, W) and a $p_{person}$ (A; X, W). It is desired to maximize $p_{person}$ (A+Δ; X, W) as per Eq. (5). It is desired to compute a minimum Δ that can maximize Eq. (5); i.e., find a small perturbation Δ to add to the image's adjacency matrix A (which represents the edges in the graph) which will increase the prediction accuracy.

In the attack case, find a small perturbation Δ to add to the image's adjacency matrix A that will minimize prediction as per Eq. (8) to boost attack effectiveness. Of course, the ultimate goal is not to facilitate nefarious attacks in reality, but to render a model susceptible to attack to research the attack process to enhance robustness in real-world situations (identify the vulnerable points so the model builder can strengthen the model).

The parameter Δ includes the links/edges to add and/or remove; it is desired to compute Δ so as to suggest links to add and/or remove. Each link is one number in the heat map 807; the heat map illustrates A. The paintbrush icon, in the example, suggests adding one cell; the scissors icon, in the example, suggests setting two cells equal to zero. In the example of 80 labels, the perturbation Δ is also an 80×80 matrix but it will typically be a sparse matrix—say 3 non-zero values, two values signifying cut (negative) and one value signifying add (positive), all other values are zero.

Referring to step 707, one or more embodiments further include rendering the gradient-based saliency matrix in the computerized user interface; the user input is 708A and/or 708B responsive to the rendering.

Referring to FIGS. 6-10 and Eq. (5)-(7), one or more embodiments further include determining a minimum perturbation Δ to add to the adjacency matrix A while maximizing prediction accuracy $p_c$ of the model. In this aspect, the rendering explains the model; and the user input includes at least one of: adding a missing edge to improve the prediction accuracy; and at least one of derating and removing an unimportant edge to improve the prediction accuracy.

Figure 12:
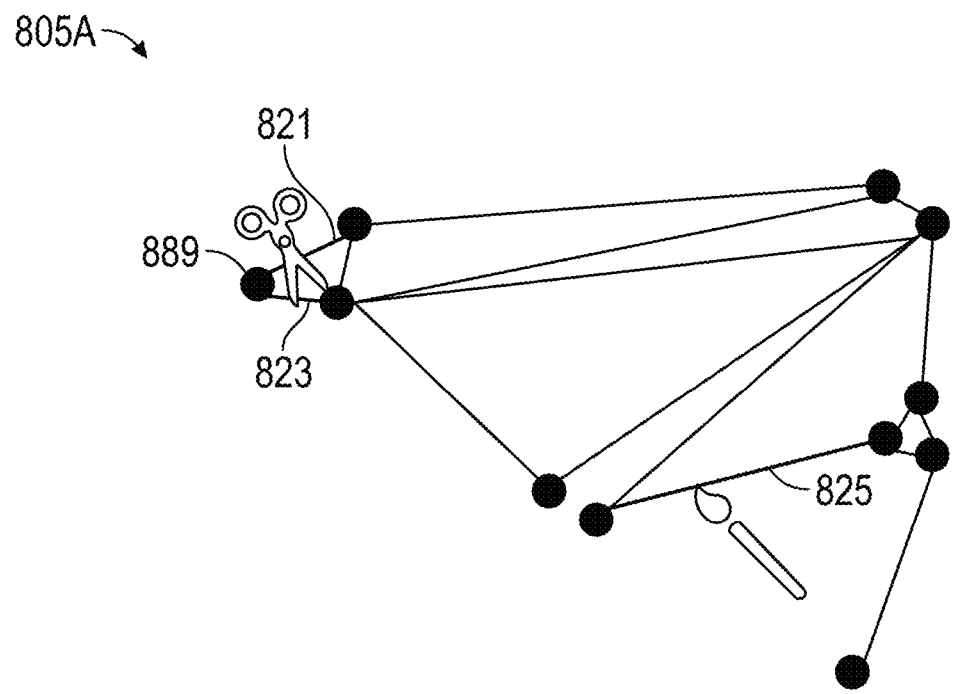

Referring to FIGS. 11 and 12 and Eq. (8) and (9), one or more embodiments further include determining a minimum perturbation Δ to add to the adjacency matrix A while minimizing prediction accuracy $p_c$ of the model. In this aspect, the rendering explains the model; and the user input includes at least one of: adding a missing edge to boost adversarial attack performance; and removing an existing edge to boost the adversarial attack performance.

In one or more embodiments, the input instance includes an image (e.g. digital photograph) to be recognized; however, this is a non-limiting example and many other applications are possible (see caffeine molecule example). In general, one or more embodiments test a model to understand why the model made certain predictions (right or wrong). Another particular application is detecting and remediating bias, such as bias against a legally protected class. For example, suppose there are two population classes, Class A (protected class subject to bias) and Class B. The model may always predict correctly if it is dealing with member of Class B plus mode of transportation C, but may predict incorrectly if it is dealing member of Class A plus mode of transportation C. With visualization in accordance with aspects of the invention, the user can make sense of such a prediction: what edges influence these two distinct performance results.

In one or more embodiments, the rendering includes one or more of a global network 803, an instance sub-network 805, 805A, an instance full adjacent matrix 807 (e.g. heat map), and an instance applied adjacent matrix with a threshold applied 809 (e.g., a display element selected from the group consisting of a global network, an instance sub-network, an instance full adjacent matrix, and an instance applied adjacent matrix with a threshold applied).

In one or more embodiments, the interpretation accuracy will be higher, as compared to prior art techniques, thus improving the technological process of artificial intelligence/machine learning. In some cases, the computer carrying out the ML/AI process could make use of this increased accuracy to achieve acceptable results with reduce CPU time and/or memory usage as compared to the prior art.

In another aspect, an exemplary system includes a memory (e.g. 30, discussed elsewhere); a non-transitory computer readable medium (e.g. 34, discussed elsewhere) including computer executable instructions; and at least one processor 16, coupled to the memory and the non-transitory computer readable medium, and operative to execute the instructions to be operative to perform any one, some, or all of the method steps described above. The instructions on the medium can also configure the processor to instantiate appropriate software components; for example, 799, 797, 715, and so on.

Figure 14:
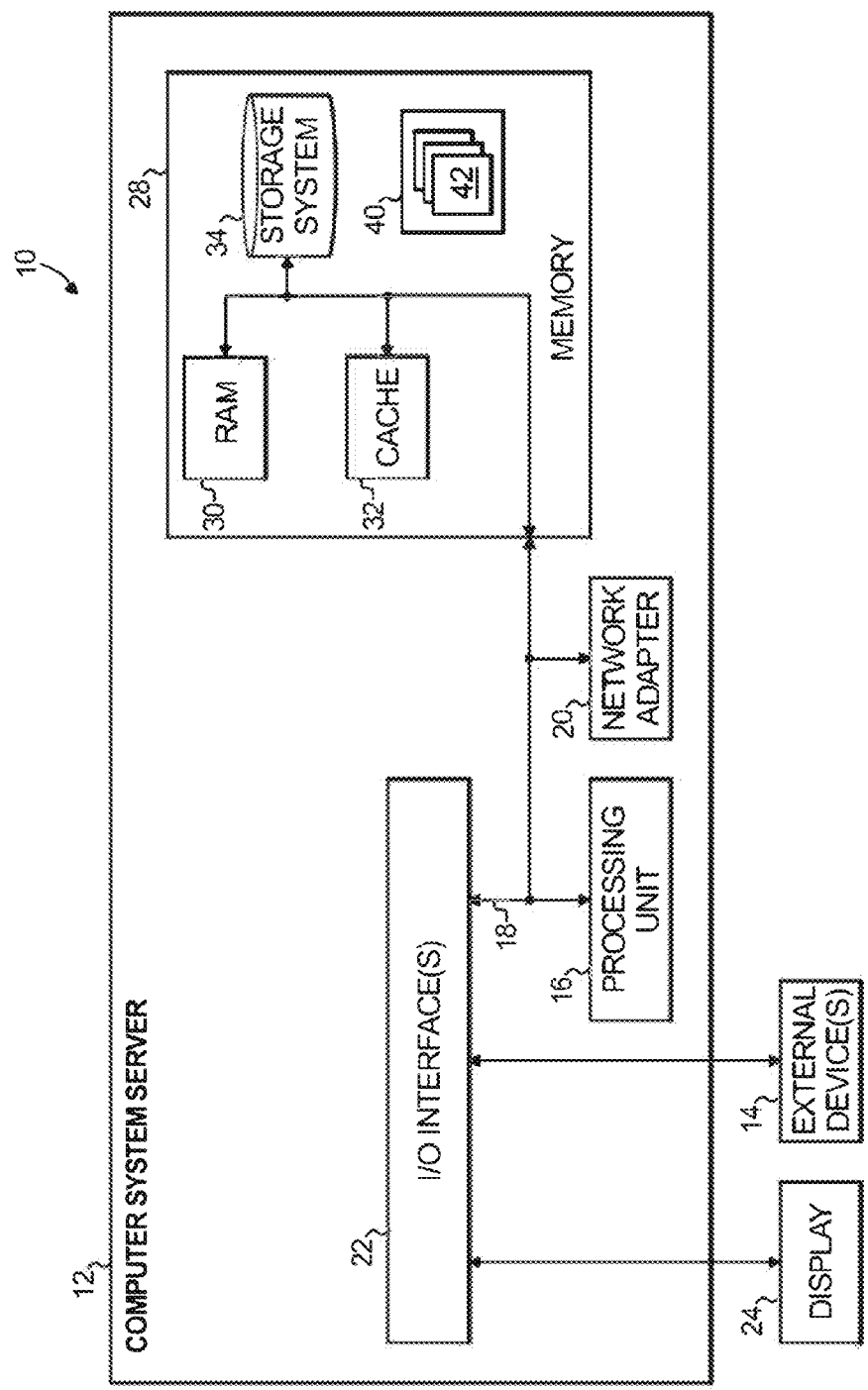
FIG. 14 depicts a computer system that may be useful in implementing one or more aspects and/or elements of the invention, also representative of a cloud computing node according to an embodiment of the present invention.

One or more embodiments of the invention, or elements thereof, can accordingly be implemented in the form of an apparatus/system including a memory and at least one processor that is coupled to the memory and operative to perform exemplary method steps. FIG. 14 depicts a computer system that may be useful in implementing one or more aspects and/or elements of the invention, also representative of a cloud computing node according to an embodiment of the present invention. Referring now to FIG. 14, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 14, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 14, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 14) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text. Consider, e.g., a cloud-based service 96 (or one or more elements thereof) to provide an interpretable visualization system for graph neural network and the like, located in layer 90.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described; e.g. GNN model 799, GNN-Interpretation module 797, UI 715, and the like. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
using a computerized trained graph neural network model to classify an input instance with a predicted label;
with a computerized graph neural network interpretation module, computing a gradient-based saliency matrix based on said input instance and said predicted label, by taking a partial derivative of class prediction with respect to an adjacency matrix of said model;
rendering said gradient-based saliency matrix in a computerized user interface;
with said computerized user interface, obtaining user input responsive to said gradient-based saliency matrix, wherein said user input is responsive to said rendering; and
determining a minimum perturbation to add to said adjacency matrix that maximizes prediction accuracy of said model, wherein:
said rendering showing information related to said model; and
said user input comprises at least one of:
adding a missing edge based on a gradient-based saliency map-based graph explanation to improve said prediction accuracy; and
at least one of derating and removing an unimportant edge based on the gradient-based saliency map-based graph explanation to improve said prediction accuracy.

2. The method of claim 1, further comprising:
modifying said trained graph neural network model based on said user input; and
re-classifying said input instance with a new predicted label based on said modified trained graph neural network model.

3. The method of claim 1, wherein
said user input comprises at least one of:
adding another missing edge to boost adversarial attack performance; and
removing another existing edge to boost said adversarial attack performance.

4. The method of claim 1, wherein said input instance comprises an image to be recognized.

5. The method of claim 1, wherein said rendering includes at least one of a global network, an instance sub-network, an instance full adjacent matrix, and an instance applied adjacent matrix with a threshold applied.

6. An apparatus comprising:
a memory; and
at least one processor, coupled to said memory, and operative to:
instantiate a computerized trained graph neural network model, a computerized graph neural network interpretation module, and a computerized user interface;
use said computerized trained graph neural network model to classify an input instance with a predicted label;
with said computerized graph neural network interpretation module, compute a gradient-based saliency matrix based on said input instance and said predicted label, by taking a partial derivative of class prediction with respect to an adjacency matrix of said model;
rendering said gradient-based saliency matrix in the computerized user interface;
with said computerized user interface, obtain user input responsive to said gradient-based saliency matrix, wherein said user input is responsive to said rendering; and
determining a minimum perturbation to add to said adjacency matrix that maximizes prediction accuracy of said model, wherein:
said rendering showing information related to said model; and
said user input comprises at least one of:
adding a missing edge based on a gradient-based saliency map-based graph explanation to improve said prediction accuracy; and
at least one of derating and removing an unimportant edge based on the gradient-based saliency map-based graph explanation to improve said prediction accuracy.

7. The apparatus of claim 6, wherein said at least one processor is further operative to:
modify said trained graph neural network model based on said user input; and re-classify said input instance with a new predicted label based on said modified trained graph neural network model.

8. The apparatus of claim 6, wherein said user input comprises at least one of:
adding another missing edge to boost adversarial attack performance; and
removing another existing edge to boost said adversarial attack performance.

9. The apparatus of claim 6, wherein said input instance comprises an image to be recognized.

10. The apparatus of claim 6, wherein said computerized user interface is configured to render at least one of a global network, an instance sub-network, an instance full adjacent matrix, and an instance applied adjacent matrix with a threshold applied.

11. A non-transitory computer readable medium comprising computer executable instructions which when executed by a computer cause the computer to perform a method of:
instantiating a computerized trained graph neural network model, a computerized graph neural network interpretation module, and a computerized user interface;
using said computerized trained graph neural network model to classify an input instance with a predicted label;
with said computerized graph neural network interpretation module, computing a gradient-based saliency matrix based on said input instance and said predicted label, by taking a partial derivative of class prediction with respect to an adjacency matrix of said model;
rendering said gradient-based saliency matrix in the computerized user interface;
with said computerized user interface, obtaining user input responsive to said gradient-based saliency matrix, wherein said user input is responsive to said rendering; and
determining a minimum perturbation to add to said adjacency matrix that maximizes prediction accuracy of said model, wherein:
said rendering showing information related to said model; and
said user input comprises at least one of:
adding a missing edge based on a gradient-based saliency map-based graph explanation to improve said prediction accuracy; and
at least one of derating and removing an unimportant edge based on the gradient-based saliency map-based graph explanation to improve said prediction accuracy.

12. The non-transitory computer readable medium of claim 11, wherein the performed method further comprises:
modifying said trained graph neural network model based on said user input; and
re-classifying said input instance with a new predicted label based on said modified trained graph neural network model.

13. The non-transitory computer readable medium of claim 11, wherein said user input comprises at least one of:
adding another missing edge to boost adversarial attack performance; and
removing another existing edge to boost said adversarial attack performance.

14. The non-transitory computer readable medium of claim 11, wherein said input instance comprises an image to be recognized.

* * * * *